United States Patent Office 3,585,184
Patented June 15, 1971

3,585,184
2-AMINO - 2 - DEOXY-D-GLUCOPYRANO-D-GLUCOPYRANANS HAVING THE ALPHA-D-GLUCOSE CONFIGURATION, METHOD, AND USE
Melville L. Wolfrom and Paul Y. Wang, Columbus, Ohio, assignors to The Ohio State University, Columbus, Ohio
No Drawing. Filed Dec. 29, 1967, Ser. No. 694,382
Int. Cl. C07g 3/00
U.S. Cl. 260—209
21 Claims

ABSTRACT OF THE DISCLOSURE 2-amino-2-deoxy - D - glucopyrano-D-glucopyranans (briefly, 2-amino-2-deoxy-amyloses) having the alpha-D-glucose configuration and method of producing same from amylose with retention of configuration, intermediates therefor, and use thereof. An especially valuble utility is in the synthesis of heparin.

BRIEF DESCRIPTION OF THE INVENTION

The invention relates to 2-amino-2-deoxy-amylose compounds and their production and use, and intermediates therefor. One product of the invention of especial interest is that fraction of the cereal starches known as amylose, which has been modified so that the hydroxyl on the C–2 carbon (the second carbon atom) has been replaced by amino in the same configuration in approximately one-half of each alpha-D-glucose unit. Since the amylose molecule polymeric unit is believed to be regular, every second unit would have this modification, and the name to be assigned this product would be (1→4)-(2-amino-2-deoxy-alpha-D-glucopyrano) - (1→4) - (alpha-D-glucopyranan). The process briefly comprises the steps of oxidizing 6-O-tritylamylose with dimethyl sulfoxide to give the 2-ketone, oximating the 2-ketone product with hydroxylamine to give the 2-oxime, reducing the 2-oxime product with lithium aluminum hydride to give the 2-amine, and detritylating the product with acid to give the 2-amino-2-deoxy-amylose. Intermediates, single steps, various combinations of steps, and product uses are also considered inventive. The use of the 2-amino compounds in the synthesis of heparin is one such inventive use.

BACKGROUND OF THE INVENTION

The closest prior art known to us is represented by the chitin-related chitosan derivative containing an acetylated amino group in both halves of its D-glocose unit. Chitosan is of course a cellulose analog, not a starch analog, and has the (1–4)-beta (not alpha) D-glucose configuration. The value of this product is in question. Also, attention is directed to Rigby, U.S. Patent 2,040,879 (1936) which discloses another cellulose analog, having the (1–4)-beta (not alpha) D-glucose configuration and an amino group on both halves of its D-glucose unit. Since both of these products are cellulose derivatives, they are insoluble in water, as contrasted to Compound VI of the present invention, which is readily soluble in water in either its free base or acid addition salt form. These products, obviously greatly different in structure and inherent characteristics (from the compounds of the present invention) neither possess the same uses as the compounds of the present invention nor do they suggest the structure, characteristics or uses of the compounds of the present invention. In other work known to us in the sugar area, prior art workers carried out somewhat related reactions using simple but highly substituted sugars having only a single hydroxyl group available (unblocked) per D-glucose unit, and ended up with inversion to the opposite configuration or at best to a mixture of configurations. In addition, only cationic starches with substituents on oxygen atoms, in which no control as to amount or which carbon atom oxygen is substituted, are known. In contrast, we have found it possible to start with a specific polymer, amylose, having its specific desirable configuration, introduce a single block at the 6 position in approximately both halves of the D-glucose unit, retain the desirable amylose configuration throughout the entire series of reactions to produce the desired valuable 2-amino-2-deoxyamylose compounds (V and VI) in relatively high yields and as well-defined and characterized polymeric products. Neither the products themselves, the process for producing the same, nor the advantages thereof were predictable or obvious from the teachings of the prior art at the time of our invention or discovery thereof.

OBJECTS OF INVENTION

It is accordingly an object of the invention to provide new and valuable 2-amino-2-deoxyamylose compounds, a process for the production thereof from amylose with retention of configuration, intermediates therefor, and uses thereof, especially use in the synthesis of heparin. A particular object of the invention is to provide a modification of that fraction of the cereal starches known as amylose, by which modification the hydroxyl group at the C–2 position (second carbon atom) has been replaced by amino in the same configuration, in approximately one-half of each alpha-D-glucose unit, a process for production thereof from amylose, intermediates therefor, and uses thereof, especially use in the synthesis of heparin. Other objects will become apparent hereinafter and still other objects will be apparent to one skilled in the art to which this invention pertains. See Chart I.

GENERAL DESCRIPTION OF THE PROCESS

Reference will be made to Chart I for a better understanding of the process. In this Chart I, all the steps are illustrated and given a number, i.e., 1 through 5. Step 1 produces compound II from compound I, Step 2 compound III from II, Step 3 produces IV from III, Step 4 produces V from IV, and Step 5 produces VI from V. Compound V may be subjected to a further series of reactions, as shown in Chart II, for the production of heparin. The ultimate product of this series of reactions, compound VI, in either free base or acid addition salt form, retains the polymeric structure of amylose (I) and affords an essentially uniform heteropolymer containing almost entirely D-glucose and 2-amino-2-deoxy-D-glucose as its constituent units.

Step 1: I→II (See Example 1)

Tritylation of amylose with triphenyl chloromethane to give 6-O-tritylamylose is a known procedure and the

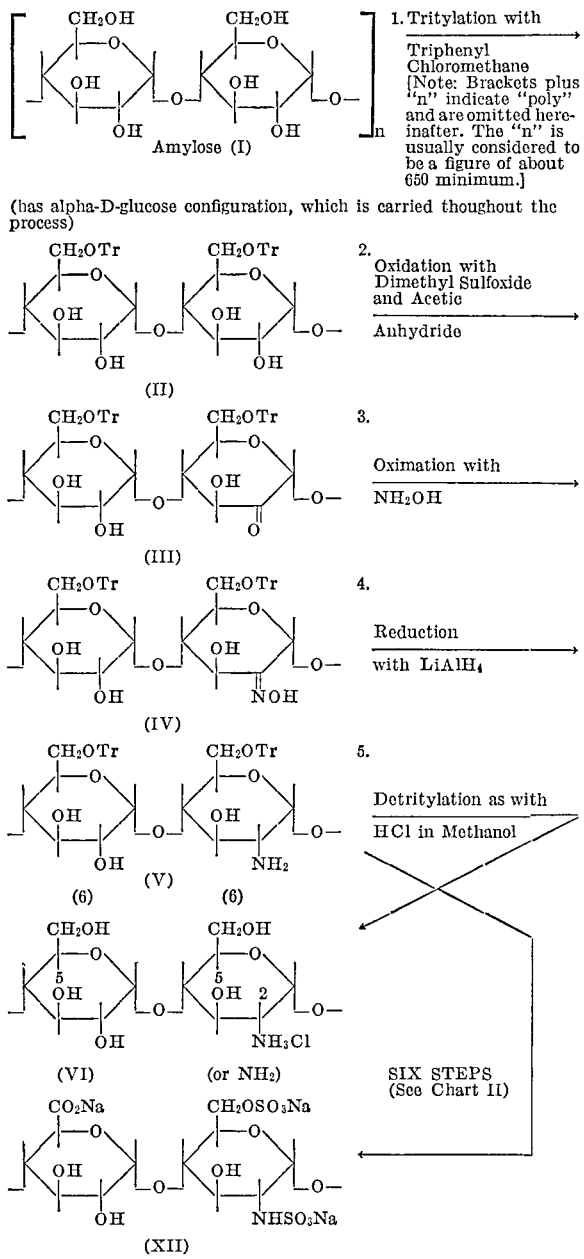

CHART I
AMYLOSE (I) TO 2-AMINO-2-DEOXY-AMYLOSE (VI)—GENERAL SCHEME

Heparin, Sodium salt (See Chart II for complete unit)

product is also known. The trityl groups are introduced to protect the 6-hydroxyl groups during subsequent reactions.

Step 2: Oxidation with dimethyl sulfoxide and acetic anhydride: II→III (See Example 2)

6-O-tritylamylose is oxidized by a solution of dimethyl sulfoxide and acetic anhydride at room temperature to give III in over 90% yield. The extent of oxidation corresponding to a D.S. 0.8 (degree of substitution) is attainable. The temperature may be elevated to as high as 100° C. The product is white at room temperature but heating may result in browning of the the product. Room temperature or thereabout is therefore preferred. Stirring for up to about 20–30 hours may be employed to effect efficient contact between the reactants. With heating at 60° C., three hours is a sufficient reaction period. Other acid anhydrides, organic or inorganic, may be used in place of acetic anhydride, for example, phosphorus pentaoxide ($P_2O_5$, the phosphoric anhydride), trifluoroacetic acid anhydride, trichloroacetic acid anhydride, or the like. Acetic anhydride is preferred because it is inexpensive and easy to remove after completion of the reaction by precipitation. The reaction is conducted under anhydrous conditions. Equivalent amounts of reactants may be employed, but up to a 20-fold excess of the dimethyl sulfoxide oxidizing agent can be employed, if desired, any excess acting as solvent for the reaction. The product may be recovered by stirring the reaction mixture in chilled alcohol, e.g., methanol, collecting the precipitate, and washing and drying the same to give a cream-colored powder.

Step 3: Oximation with $NH_2OH$: III→IV (See Example 3)

Compound III is oximated with hydroxylamine hydrochloride in pyridine solution to give IV in over 90% yield. Heterogeneous reaction conditions may be employed, as in case of alcohol, e.g., ethyl alcohol, or other solvent. Homogeneous reaction conditions are preferred. Pyridine, lutidines, collidines and other liquid tertiary amines are preferred as solvents since they act both as solvent and as acid acceptor. Since hydroxylamine is a gas at room temperature, it is preferably used in the form of its hydrochloride or other salt, e.g., its sulfate. The temperature may be about room temperature to about 100° C., with 80° C. being suitable for a relatively short reaction time, e.g., about two hours. Lower temperatures require longer reaction periods. A condenser is generally used at the higher temperatures. The oximated product may be recovered by pouring the reaction mixture into chilled alcohol, e.g., methanol or ethanol, filtering, and washing and drying the precipitate, preferably at about 57° C. and under a vacuum over a suitable drying agent such as calcium sulfate in the form of its soluble anhydrite (Drierite—TM).

Step 4: Reduction with $LiAlH_4$: IV→V (See Example 4)

The oxime IV is reduced with excess lithium aluminum hydride in tetrahydrofuran solution at reflux to give the reduced product V in over 80% yield with retention of configuration. As solvents, tetrahydrofuran, dioxane, bis-(methoxyethyl) ether and the like are preferred, although others conventionally used for lithium aluminum hydride reductions may also be employed. Reflux temperatures are ordinarily employed but, when the solvent boils at a relatively high temperature, temperatures below reflux and not in excess of 80° C., preferably less, are employed. The higher the temperature, the shorter the reaction period, and vice versa. Use of tetrahydrofuran or dioxane at reflux represent optimum conditions. Upon completion of reactions, excess $LiAlH_4$ is destroyed in the usual manner with acid, preferably by adding the acid dropwise and with cooling until a neutral pH is attained. Use of 1 to 3 __ormal hydrochloric acid is preferred. Recovery of product is advantageously effected by evaporating solvent, adding the slurry to about 1 Normal hydrochloric acid, collecting the precipitate, washing in additional 1 Normal HCl, washing with distilled water until netrural, and either in vacuo or air drying. Other suitable procedures for recovery may be employed and will be apparent to one skilled in the art. The product is obtained as a white powder. This product may be used as such in the synthesis of heparin, as illustrated by Chart II.

Step 5: Detritylation: V→VI (See Example 5)

Compound V is detritylated in three hours with methanolic hydrogen chloride followed by precipitation in ether to give the theoretical yield of VI, and 60% of the detritylated product VI is nondialyzable through cellophane membrane against water. The reaction involved is a conventional trityl ether cleavage. A small amount of acid in any medium or solvent which serves as suspending agent may be employed. A small amount of HCl in alcohol, e.g., methanol, is preferred. Sulfuric acid gives a yellow product. Stirring is employed to effect efficient contact of the reactants. Other suitable solvents include dioxane and chloroform. Sulfuric acid is another suitable acid. Moderate reaction conditions and a temperature at or close to room temperature are preferred. Filtration, washing and drying gives the desired product in the form of a white powder. Dissolving the product in water, dialysis against water, and freeze-drying gives a cream-colored powder which is slightly hygroscopic (the HCl salt). The acid addition salt may be converted to its free base as illustrated by Example 6, or converted to other acid addition salts, including usual inorganic acid addition salts and organic monobasic or dibasic acid salts, including acetic, propionic, and the like in the usual manner from the free base by acidification or from another acid addition salt by neutralization and reacidification, in either case in the presence of any suitable solvent or liquid suspending medium.

SPECIFIC EMBODIMENTS OF THE INVENTION

The following examples are given to illustrate the products and process of the present invention, but are not to be construed as limiting.

EXAMPLE 1

Preparation of 6-O-tritylamylose [II. 6-O-tritylamylose or (1→4)-6-O-trityl-alpha-D-glucopyranan] (This preparation is from publication of R. L. Whistler and S. Hirase, J. Org. Chem., 26, 4600 (1961)

Amylose [(1→4)-alpha-D-glucopyranan] (Stein-Hall Superlose HAA–11–HV, Control #19765; 100 gm.) was swelled in 1 liter of pyridine containing 100 ml. of distilled water for 20 h. with occasional shaking at room temperature. The water was then distilled under reduced pressure at 40° C. with mechanical stirring until about 1 liter of pyridine was collected. Anhydrous pyridine was added continuously to maintain the volume of the swollen material. The distillation was continued at atmospheric pressure until the boiling point of pyridine was reached.

The suspension of a highly swollen amylose was cooled to 80° C. and triphenyl chloromethane (508 gm.; 3 molar equivalent excess) was added directly into the suspension with vigorous stirring. The temperature was then raised to 95° C. and kept at this temperature for 3 h. After cooling to room temperature, the dark brown solution was poured into 5 liters of methanol (4° C.) with high speed stirring. The white, fine precipitate was collected on a Büchner filter, washed exhaustively with methanol and then dried over sodium hydroxide pellets in vacuo for 40 h. at 40° C. Yield 244.4 gm. (98.4% of theory).

Analysis.—Calc. for $[C_6H_7O_2(OH)_2(OC_{19}H_{15})_1]_n$ (percent): C, 74.23; H, 5.98. Found (percent): C, 74.24; H, 5.74.

EXAMPLE 2

Oxidation of 6-O-tritylamylose with dimethyl sulfoxide-acetic anhydride to produce III. (1→4)-(6-O-trityl-alpha-D-arabino-hexopyranosulo)-(1→4)-(6-O-trityl-alpha-D-glucopyranan)

6-O-tritylamylose (60.0 gm.; 150 m. mole) was dissolved in 450 ml. of anhydrous dimethyl sulfoxide with magnetic stirring overnight. Acetic anhydride (300 ml.) was added to the gelatinous solution and the stirring was continued for 22 h. at room temperature. The thick, light brown solution was poured into 10 liters of chilled methanol (0° C., Dry Ice) with vigorous stirring. The fine precipitate was collected, washed with methanol, and dried in vacuo over sodium hydroxide pellets for 20 h. Yield of the cream-colored powder was 58.8 gm. (98% based on starting material).

EXAMPLE 3

Oximation of the oxidized 6-O-tritylamylose (III) to produce IV. (1→4)-(6-O-trityl-alpha-D-arabino-hexopyranosulo oxime)-(1→4)-(6-O-trityl-alpha-D-glucopyranan)

The oxidized product (III, 20.2 gm.) was dissolved, with magnetic stirring, in pyridine (450 ml.) containing 34.8 gm. of hydroxylamine hydrochloride. When all the material had dissolved, the temperature of the solution was raised to 80° C. for about 3 h. The oximated product (IV) was recovered by precipitation in cold, 50% aqueous methanol, washed and dried in vacuo over Drierite (anhydrous calcium sulfate) for 20 h. Yield of the slightly purplish powder was 19 gm. (95% based on III), $[alpha]_D^{21}$ +50° (c., 0.3 in dioxane).

Analysis.—Found (percent): N, 2.71 (D.S. 0.8).

EXAMPLE 4

Reduction of the oxime (IV) to produce V. (1→4)-(2-amino-2-deoxy-6-O-trityl-alpha-D-glucopyrano)-(1→4)-(6-O-trityl-alpha-D-glucopyranan)

The oximated product (IV, 1.9 gm.) was dissolved in anhydrous tetrahydrofuran (100 ml.) and lithium aluminum hydride (2.3 gm.) was added directly to the cherry-red solution followed by immediate reflux of the solution for 20 h. Excess lithium aluminum hydride was destroyed by the addition of hydrochloric acid (2 N) to the cooled solution (0° C.). When the evolution of hydrogen had ceased, the pH of the white slurry was adjusted to 7 and tetrahydrofuran was evaporated under reduced pressure at 40° C. Dilute hydrochloric acid (1 N, 500 ml.) was added to the slurry to dissolve the inorganic salts and the reduced product (V) was recovered by filtration. The white, reduced material was washed with 1 N hydrochloric acid, distilled water (until neutral) and then dried in vacuo over sodium hydroxide pellets. Yield of the white powder was 1.6 gm. (84.4% based on IV), $[alpha]_D^{21}$ +45° (c., 1.0 in dioxane).

Analysis.—Found (percent): N, 2.01.

EXAMPLE 5

Detritylation of the aminated 6-O-tritylamylose (V) to give VI. (1→4)-(2-amino-2-deoxy-alpha-D-glucopyrano hydrochloride)-(1→4)-(alpha-D-glucopyranan)

The reduced material (V, 1.5 gm.) was suspended in methanol (100 ml.) containing concentrated hydrochloric acid (1 ml.). The suspended material dissolved within 3 h. with magnetic stirring. The volume of the methanol solution was reduced to about 20 ml. at 30° C. under reduced pressure and anhydrous ether (200 ml.) was added to precipitate the detritylated product which was recovered by filtration, washed with ether, and dried in vacuo over Drierite (anhydrous calcium sulfate). Yield of the white powder was 0.59 gm. (99% of theory). This was dissolved in water, dialyzed for 3 days against distilled water, and freeze-dried to give 0.35 gm. of a slightly hygroscopic yellow powder (60% non-dialyzable), $[alpha]_D^{21}$ +156° (c., 0.5 in water), having a pH of 7 in water.

Analysis.—Calc. for $[C_6H_7O_2(OH)_{2.4}(NH_3Cl)_{0.6}]_n$ (percent): C, 39.22; H, 5.94; N, 4.58. Found (percent): C, 39.17; H, 5.79; N, 4.51.

EXAMPLE 6

Compound VI free base

The product from Example 5 is dissolved in 1–2 N sodium bicarbonate dialyzed against distilled water for several days to one week, concentrated at about 40° C. under reduced pressure, and freeze dried. The product is a pale yellow hygroscopic solid, less stable than the hydrochloride. It gives an alkaline solution in water, having a pH of 8–8.5.

Some properties of compound (VI), that is (1→4)-(2-amino-2-deoxy-alpha - D - glucopyrano hydrochloride)-(1→4)-(alpha-D-glucopyranan)

(1) Compound VI is completely water soluble and is more stable toward acid than amylose (I).

(2) The low D.S. (>0.6) derivative is insoluble in water and dilute acid, but soluble in dilute alkali; its addition to water results in immediate dispersion.

(3) The free-base form of VI has a pH 8-8.5 in aqueous solution.

(4) A 0.5% aqueous solution of VI has good frothing action when aerated.

(5) Compound VI gives a positive ninhydrin test and can be coupled with carbonyl compounds to form water-insoluble Schiff bases.

USES

In many specialized textbooks dealing with the chemistry and technology of starch, no such aminated derivative as Compound V or Compound VI has ever been described or suggested. The closest prior art known to us has already been cited. These compounds, therefore, represent an entirely new type of starch derivative with enormous potential uses, for example:

(1) The provision of Compound VI is a breakthrough in the ultimate synthesis of heparin, a safe and powerful blood anticoagulant with wide medical applications. Compound VI has alpha-D-(1→4) linkages and essentially the same 2-amino-2-deoxy-D-glucose content as natural heparin. The introduction of a carboxyl group on C–6 of the D-glucose units in VI followed by sulfation affords a polyelectrolyte with the chemical structure of heparin. Use of the blocked Compound V in the heparin process is illustrated in detail hereinafter.

(2) The sulfated derivative of VI exhibits lipemia-clearing action (but essentially no blood anticoagulant activity) necessary in the management of atherosclerosis and other conditions associated with hyperlipemia. The only reliable and recommended anti-lipemic agent currently in use is heparin, whose animal origin and blood anti-coagulation activity often cause undesirable contra-indications. This sulfated derivative of VI is prepared in the same manner as given hereinafter for the preparation of heparin by sulfation of Compound XI.

(3) The free-base form of VI is useful as a non-laxative antacid in the control of stomach hyperacidity. Currently popular antacid agents contain magnesium hydroxide which is laxative and imparts an objectionable chalky taste. Compound VI with varied D.S. (degree of substitution) may also be used as a diluent, binder or coating for medicinal tablets imparting sustained release properties to the active ingredient.

(4) Coupling of the amino group in VI with usual suitable aromatic carbonyl groups affords a great variety of polymer dyes.

(5) The frothing action and the polyelectrolytic feature of VI in aqueous solution make it useful in the mining industry for the separation of specific minerals, as by froth flotation.

(6) The special properties of VI find broad use in the textile industry for sizing fabrics which cannot be subjected to drastic desizing treatment. It is also useful as a water-soluble carrier for pigments and dyes in the printing of textile goods. Compound VI can also be applied as a cationic protective colloid to impart shrink resistance to wool.

(7) The aminated derivative VI can be compounded with rubber or polyvinyl chloride in the production of micro-porous fibers for battery separators and first-aid dressings. A recent patent assigned to National Lead Company (U.S. Pat. No. 3,305,498 issued Feb. 21, 1967) involves the leaching of so-compounded cellulose with hot cuprammonium solution to create porous plastic fibers. The substitution of cellulose by Compound VI in the same process has definite advantages.

SYNTHESIS OF HEPARIN FROM COMPOUND V

The following disclosure and examples are given to illustrate the synthesis of heparin from Compound V, but are not to be construed as limiting.

Step I (Chart II): Blocking of the amino group of V. (1→4) - (2 - amino - 2 - deoxy-6-O-trityl-alpha-D-glucopyrano) - (1→4) - (6-O - trityl-alpha-D-glucopyranan) [produces VII. (1→4) - (N-R$_1$-N-R$_2$-2-amino-2-deoxy-6-O - trityl - alpha - D - glucopyrano)-(1→4)-(6-O-trityl-alpha-D-glucopyranan)].

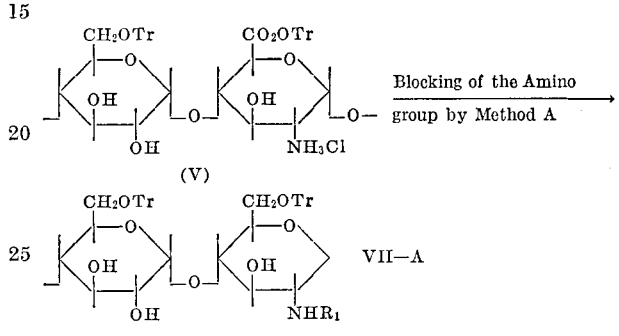

Method A

The quantitative blocking of the amino group using Method I generally has the blocking group (R$_1$) form a single covalent bond with the amino group. A few typical examples of introducing the group R$_1$ into V are as follows:

(a) The trifluoroacetyl group.—Three grams of compound V is dissolved in 50 ml. of dioxane and 4.0 grams of NaHCO$_3$ is added over a period of 20 h. to maintain the pH of the reaction medium around 8–8.5. An amount of 2.0 ml. of S-ethyltrifluorothioacetate is added in addition to about 3 ml. of water to aid the solution of the bicarbonate. The reaction mixture is stirred for 20 h. at 20–30° C., filtered and precipitated in methyl alcohol.

The trifluoroacetyl group can also be introduced by the use of trifluoroacetic anhydride. In this case, compound V (5 gm.) is dissolved in methylene chloride containing 20 ml. of anhydrous pyridine. The solution is then cooled to 0° C. and trifluoroacetic anhydride (20 ml.) is added dropwise over a period of 3 h. with stirring and the reaction continued for 20 h. at 20–25° C. The N-trifluoroacetylated compound V is recovered by precipitation is ice water (400 ml.) containing 10% methanol.

(b) The 3-keto - 5,5 - dimethylcyclohexylidene (dimedone) group.—One gram of compound V is dissolved in CHCl$_3$ (20 ml.) and extracted twice with 0.1 N NaHCO$_3$ (10 ml.) and the chloroform layer washed with distilled water until neutral. 5,5-dimethylcyclohexane-1,3-dione (0.24 gm.) is added to the chloroform solution containing the free amino form of compound V, the solution refluxed for 2 h., and precipitated in methanol.

Other blocking groups, which form single covalent bonds with the amino group in compound V, can also be used, such as:

(i) Benzyloxycarbonyl, t-butyloxycarbonyl, and allyloxycarbonyl groups (ii) The acyl groups, e.g., acetyl, benzoyl, formyl, succinoyl, trichloroacetyl, phthaloyl, o - nitrophenoxyacetyl groups, etc.

(iii) The sulfur-containing blocking groups, such as p-tolylsulfonyl, benzylsulfonyl, tritylsulfonyl groups, etc.

(iv) The trityl group (v) The 2,4-dinitrophenyl group (vi) Bis(phenoxy or benzyloxy)phosphinyl group (vii) The trimethylsilyl group

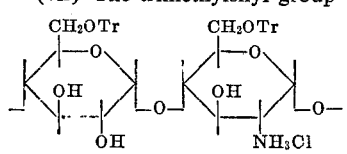
(V)

Blocking of the Amino group by Method B
———————————→
Formation of Schiff base

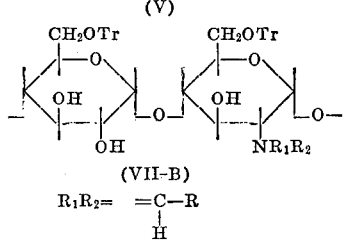
(VII-B)

$R_1R_2 = =C-R$
           $|$
           $H$

Method B

In this method the blocking group forms a double bond with the amino function and the resulting compound is called a Schiff base. For example: The introduction of p-methoxybenzylidene group.

One gram of compound V is dissolved in dioxane and sufficient 0.5–1 N NaHCO$_3$ solution is added to maintain the pH of the solution at 8–8.5. p-Methoxybenzaldehyde (1.2 molar equivalents) is added with stirring. The solution is stirred at 20–30° C. for 2 h., then refrigerated at 4° for 6 h. and precipitated in water.

Other carbonyl compounds which form a Schiff base with compound V are 5-chlorosalicylaldehyde, 2-hydroxynaphthaldehyde, and acylisopropylaldehyde, to name a few.

Step II: Blocking of the unsubstituted secondary hydroxyl groups [produces VIII. (1→4)-(N-R$_1$-N-R$_2$-2-amino-2-deoxy-3-O-R$_3$-6-O-trityl - alpha-D-glucopyrano)-(1→4)-(di-O-R$_3$-6-O-trityl-alpha-D-glucopyranan)].

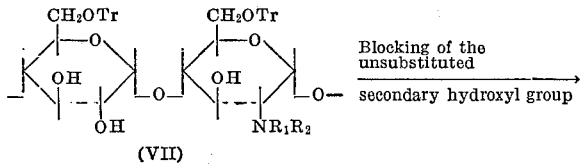
(VII)

Blocking of the unsubstituted
———————————→
secondary hydroxyl group

With Method A. Step I, R$_1$=a blocking group, as

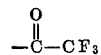

R$_2$=H; with Method B, Step I, R$_1$ and R$_2$=a blocking group having the general formula =CHR, as

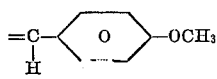

The unsubstituted secondary hydroxyl groups can be blocked by many standard methods, the following being examples:

(A) Acetylation.—Compound VII (5.00 gm.) is dissolved in 50 ml. of anhydrous pyridine with stirring. Acetic anhydride (4×molar equivalent) is added with cooling. After stirring at 20–30° C. for 20 h., the solution is precipitated in cold methanol or water. The reaction can be repeated to attain complete blocking. Other aliphatic and other acid anhydrides may also be used.

(B) Phenylcarbamylation.—Compound VII (5.00 gm.) is dissolved in 100 ml. of absolute pyridine and phenyl isocyanate (2×molar equivalent) is added with stirring. The solution is then warmed to 80–100° C. for 3 h., cooled to 20–30° C. and precipitated in anhydrous methanol. This reaction can be repeated to attain complete substitution.

Other blocking groups, such as the benzyl ether or trichloroacetyl groups, can also be used for this purpose.

Step III: Detritylation [produces IX. (1→4)-(N-R$_1$-N-R$_2$-2-amino-2-deoxy-3-O-R$_3$-alpha-D-glucopyrano) - (1→4)-(di-O-R$_3$-alpha-D-glucopyranan)].

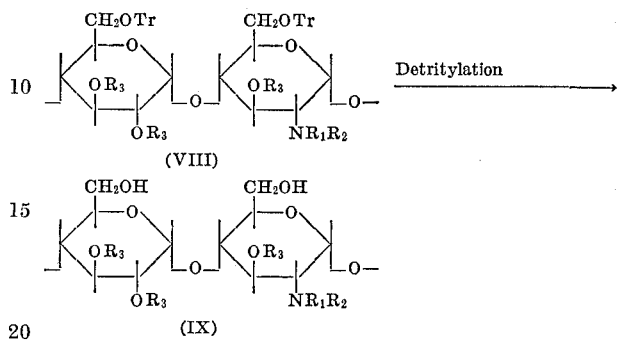

One gram of Compound VIII was suspended in 100 ml. of methanol containing 1 ml. of 10–11 N hydrochloric acid and stirred at 20–25° C. for 1–3 h. The detritylated product (IX) was recovered by the addition of petroleum ether (B.P. 30–60° C.). Instead of methanol, other organic solvents such as dioxane, diglyme, methyl cellosolve, chloroform, etc. can also be used.

Step IV: Oxidation of C–6 primary hydroxyl on the D-glucose unit [produces X. (1→4)-(N-R$_1$-N-R$_2$-2-amino-2-deoxy-3-O-R$_3$-alpha-D-glucopyrano)-(1→4)-(di - O - R$_3$-alpha-D-glucopyranuronan), sodium salt].

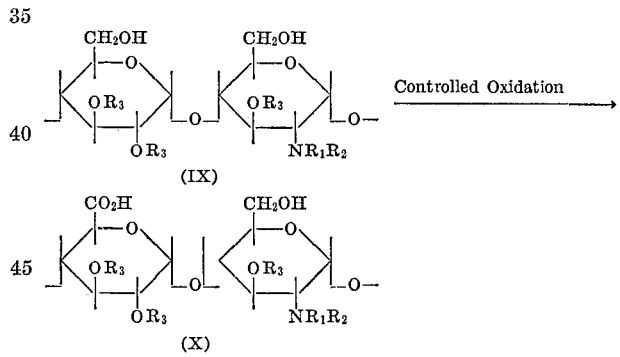

The specific oxidation of the C–6 primary hydroxyl group on the D-glucose unit requires carefully controlled conditions, a typical example of which is as follows:

Compound IX (5 gm.) is dissolved in chloroform or carbon tetrachloride (500 ml.) and a small amount of ruthenium dioxide (20 mg./gm. of IX) is added. A 5% aqueous solution of sodium metaperiodate is added dropwise over a period of 10 h. until about 2.0–2.1 molar equivalents are added. Excess ruthenium tetroxide and NaIO$_4$ are destroyed by the addition of 1-propanol and the solution containing compound X is then filtered to eliminate ruthenium dioxide. Addition of the chloroform solution to petroleum ether (B.P. 30–60°) precipitates the product.

Other procedures can also be used to oxidize the C–6 primary hydroxyl group to a carboxyl function, such as:

(1) KMnO$_4$ in acetic acid
(2) Pt/C and oxygen
(3) Nitrogen dioxide
(4) Dimethyl sulfoxide-acetic anhydride solution followed by bromine oxidation of the resulting aldehyde group
(5) Chromium trioxide in pyridine Step V: De-blocking of $R_1$, $R_2$ and $R_3$ groups [produces XI. (1→4)-(2-amino-2-deoxy-alpha - D - glucopyrano)-(1→4)-alpha-D-glucopyranuronan, hydrochloride].

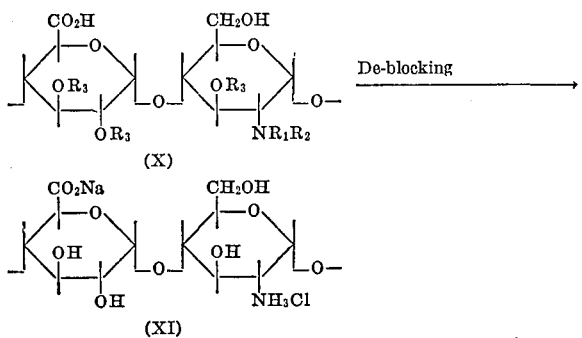

The deblocking of the $R_1$, $R_2$, and $R_3$ groups depends on the stability of these groups. The following is representative:

When $R_1 = H$,

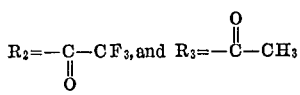

Dissolve or suspend 1 gm. of compound X in water or 50% aqueous methanol, then adjust and maintain the pH of the solution at 11-12 with 1-2 N sodium hydroxide and stir at 20-30° C. for 20-24 h. under a nitrogen atmosphere. After deblocking, the pH is adjusted to 6 with hydrochloric or other acid, then the solution is dialyzed for 4 days against running tap water, and the non-dialyzable fraction is concentrated and freeze-dried to recover compound XI. The exact acid addition salt produced will depend in the acid employed for the pH adjustment.

Step VI: Sulfation [process XII. Heparin, sodium salt].

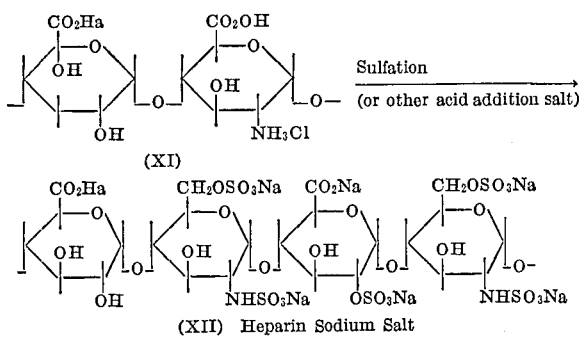

Compound XI can be sulfated by sulfur trioxide or chlorosulfonic acid in N,N-dimethylformamide, pyridine, dimethyl sulfoxide or any tertiary amine such as triethylamine. A typical sulfation procedure using sulfur trioxide in dimethylformamide is as follows.

Two grams of compound XI is dissolved in 50 ml. of freshly purified, anhydrous N,N-dimethylformamide with magnetic stirring. A solution of sulfur trioxide in N,N-dimethylformamide (2-3 N, 30 ml.) is added dropwise from a dropping funnel. The sulfation reaction is allowed to proceed for 12-15 h. at 20-30° C. Solid sodium bicarbonate is added directly into the solution to neutralize the excess sulfur trioxide and the sulfated compound XI is precipitated in methanol. After separation of the sulfated polymer by filtration, it is dissolved in water (40 ml.). Sodium carbonate (5.5 gm.) and a pyridine-sulfur trioxide complex (4 gm.) are then added to the aqueous solution of the above sulfated polymer with magnetic stirring at 15-20° C. for 5-8 h. This operation is repeated twice and the resulting solution is dialyzed against running water for three days. The non-dialyzable fraction is concentrated under reduced pressure at 35-40° C. to about 20 ml. and is then freeze-dried.

The general reaction sequence for Steps I-VI is shown in Chart II.

It is required that Product XII should be in the range of molecular weight compatible with osmotic pressure of the blood. The various steps utilizing acidity employed in the production of XII will generally be sufficient to attain this objective. Otherwise, the starting material (amylose, compound I) can be prehydrolyzed by acid to attain this objective.

Various modifications and substitutions of equivalents may be made in the process, products, compositions, conditions, and procedures of the present invention and will be immediately apparent to one skilled in the art, wherefore the invention is to be limited only by the full scope of the appended claims, including application of the doctrine of equivalents thereto.

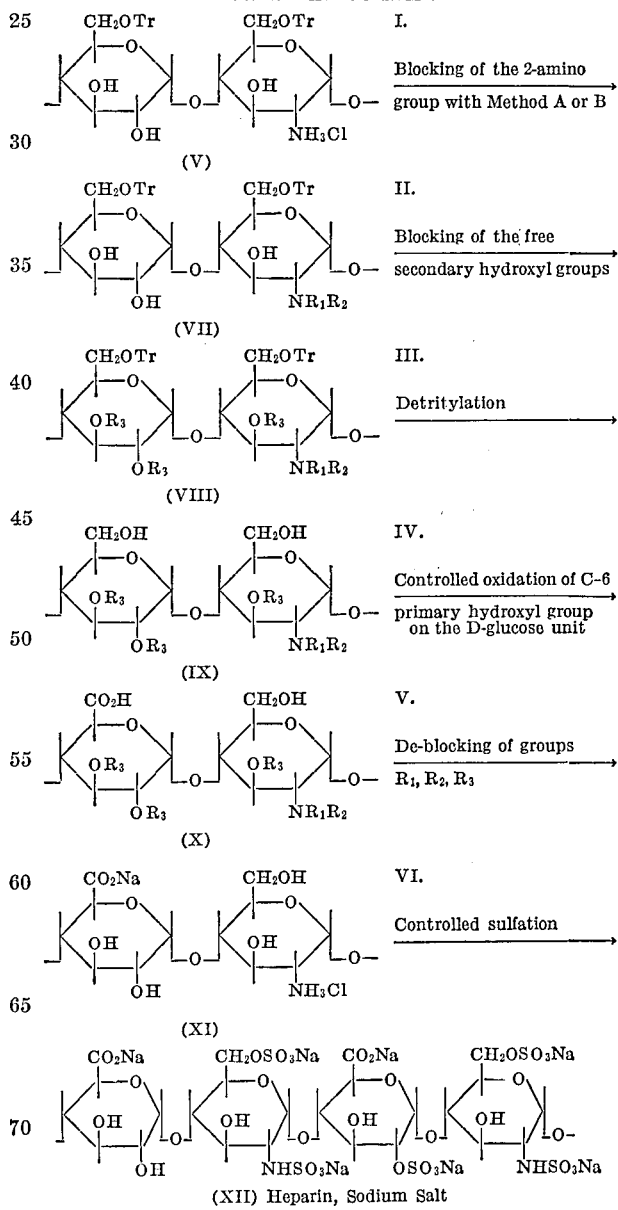

(Note: Brackets and n have been omitted throughout this chart and only the recurring unit shown.)

We claim:
1. A process for the production of that fraction of the cereal starches known as amylose which has been modified so that the hydroxyl on the C–2; second carbon atom; has been replaced by amino in the same configuration in approximately one-half of each alpha-D-glucose unit, which comprises the steps of (1) oxidizing the 2-hydroxyl group of 6-O-tritylamylose to a 2-keto group using dimethyl sulfoxide and an acid anhydride, (2) oximating the 2-keto product with hydroxylamine to produce the 2-oxime, (3) reducing the 2-oxime group to a 2-amino group with lithium aluminum hydride, and (4) detritylating the 2-amino product by cleavage with acid to restore the 6-hydroxyl groups.

2. A process for the production of $(1\to 4)$-(2-amino-2-deoxy-6-O-trityl - alpha - D - glucopyrano)-$(1\to 4)$-(6-O-trityl-alpha-D-glucopyranan) which comprises the steps of (1) oxidizing the 2-hydroxyl group of 6-O-tritylamylose to a 2-keto group using dimethyl sulfoxide and an acid anhydride, (2) oximating the 2-keto product with hydroxylamine to produce the 2-oxime, and (3) reducing the 2-oxime group to a 2-amino group with lithium aluminum hydride.

3. A process for the production of $(1\to 4)$-(2-amino-2-deoxy - 6 - O - trityl-alpha-D-glucopyrano)-$(1\to)$-(6-O-trityl-alpha-D-glucopyranan) which comprises the steps of (1) oximating $(1\to)$ - (6 - O - trityl-alpha-D-arabino-hexopyranosulo) - $(1\to 4)$ - (6 - O - trityl - alpha - D-glucopyranan) with hydroxylamine to produce the 2-oxime and (2) reducing the 2-oxime group to a 2-amino group with lithium aluminum hydride.

4. A process for the production of $(1\to 4)$-(2-amino-2-deoxy - alpha - D - glucopyrano)-$(1\to 4)$-(alpha-D-glucopyranan) which comprises the steps of (1) oximating $(1\to 4)$ - (6 - O - trityl - alpha - D - arabino - hexopyranosulo) - $(1\to 4)$ - (6 - O - trityl - alpha-D-glucopyranan) with hydroxylamine to produce the 2-oxime, (2) reducing the 2-oxime group to a 2-amino group with lithium aluminum hydride, and (3) detritylating the 2-amino product by cleavage with acid to restore 6-hydroxyl groups.

5. $(1\to 4)$ - (6 - O - trityl - alpha - D - arabino - hexopyranosulo)-$(1\to 4)$-(6-O-trityl-alpha-D-glucopyranan.

6. $(1\to 4)$ - (6 - O - trityl - alpha - D - arabino - hexopyranosulo oxime) - $(1\to 4)$ - (6 - O-trityl-alpha-D-glucopyranan).

7. $(1\to 4)$ - (2 - amino - 2 - deoxy - 6 - O - trityl-alpha-D - glucopyrano) - $(1\to 4)$ - 6 - O - trityl-alpha-D-glucopyranan).

8. $(1\to 4)$ - (2 - amino - 2 - deoxy - alpha - D - glucopyrano)-$(1\to 4)$-(alpha-D-glucopyranan).

9. $(1\to 4)$ - (2 - amino - 2 - deoxy - alpha - D - glucopyrano hydrochloride)-$(1\to 4)$-(alpha-D-glucopyranan).

10. That fraction of the cereal starches known as amylose which has been modified so that the hydroxyl on the C–2; second carbon atom; has been replaced by amino in the same configuration in approximately one-half of each alpha-D-glucose unit.

11. The product of claim 10 in the form of its hydrochloride.

12. The product of claim 10 having substantially all of the 6-hydroxyl groups of the alpha-D-glucose unit tritylated.

13. A process for producing heparin which comprises the steps of (1) blocking the free amino group of $(1\to 4)$-(2 - amino - 2 - deoxy - 6 - O - trityl - alpha - - D - glucopyrano) - $(\to 4)$-6-O-trityl-alpha-D-glucopyranan) by reacting with a member selected from the group consisting of S-ethyltrifluorothioacetate, trifluoroacetic anhydride, 5,5 - dimethylcyclohexane - 1,3 - dione, p-methoxy benzaldehyde, 5-chlorosalicylaldehyde, 2 - hydroxynaphaldehyde, and acylisopropylaldehyde; (2) blocking the free secondary hydroxyl groups of the product by reacting with a member selected from the group consisting of acetic anhydride and phenyl isocyanate; (3) detritylating with hydrochloric acid in an organic solvent so as to restore 6-hydroxyl groups; (4) oxidizing the C–6 primary hydroxyl group on the D-glucose unit by reacting with a member of the group consisting of a combination of sodium metaperiodate and ruthenium dioxide, a combination of potassium permanganate and acetic acid, a combination of platinum-on-carbon and oxygen, nitrogen dioxide, a combination of dimethyl sulfoxide-acetic anhydride solution and bromine, and a combination of chromium trioxide and pyridine, to produce a carboxyl group at C–6, (5) deblocking the amino and secondary hydroxyl groups with sodium hydroxide and (6) sulfating the resulting product by reacting with a member of the group consisting of sulfur trioxide and chlorosulfonic acid so as to produce heparin.

14. The process of producing heparin which comprises the steps of (1) oxidizing the C–6 primary hydroxyl group on the D-glucose unit of $(1\to 4)$-(2-amino-2-deoxy-alpha - D - glucopyrano) - $(1\to 4)$ - (alpha - D - glucopyranan), having its amino group and secondary hydroxyl groups blocked, by reacting with a member of the group consisting of a combination of sodium metaperiodate and ruthenium dioxide, a combination of potassium permanganate and acetic acid, a combination of platinum-on-carbon and oxygen, nitrogen dioxide, a combination of dimethyl sulfoxide-acetic anhydride solution and bromine, and a combination of chromium trioxide and pyridine, to produce a carboxyl group as C–6, (2) deblocking the amino and secondary hydroxyl groups with sodium hydroxide, and (3) sulfating the resulting product by reacting with a member of the group consisting of sulfur trioxide and chlorosulfonic acid.

15. The process of producing heparin or an alkali metal salt thereof which comprises the step of sulfating a $(1\to 4)$ - (2 - amino - 2 - deoxy-alpha-D-glucopyrano)-$(1\to 4)$-alpha-D-glucopyranuronan acid addition salt by reacting with a member of the group consisting of sulfur trioxide and chlorosulfonic acid.

16. $(1\to 4)$ - (N - $R_1$ - N - $R_2$ - 2 - amino - 2 - deoxy-6 - O - trityl - alpha - D - glucopyrano) - $(1\to 4)$ - (6 - O-trityl - alpha - D - glucopyranan), wherein the grouping N-$R_1$-N-$R_2$- is a member of the group consisting of alkylamino, acylamino, and alkylideneimino.

17. $(1\to 4)$ - (N - $R_1$ - N - $R_2$ - 2 - amino - 2 - deoxy-3 - O - $R_3$ - 6 - O - trityl - alpha  D - glucopyrano)-$(1\to 4)$ - (di - O - $R_3$ - 6-O-trityl-alpha-D-glucopyranan), wherein the grouping N-$R_1$-N-$R_2$- is a member of the group consisting of alkylamino, acylamino, and alkylideneimino, and wherein the grouping $R_3$O- is a member of the group consisting of alkyloxy, alkenyloxy, and acyloxy.

18. $(1\to 4)$ - (N - $R_1$ - N - $R_2$ - 2 - amino - 2 - deoxy-3 - O - $R_3$ - alpha - D - glucopyrano) - $(1\to 4)$ - (di - O-$R_3$-alpha-D-glucopyranan), wherein the grouping N-$R_1$-N-$R_2$- is a member of the group consisting of alkylamino, acylamino, and alkylideneimino, and wherein the grouping $R_3$O- is a member of the group consisting of alkyloxy, alkenyloxy, aryloxy, and acyloxy.

19. $(1\to 4)$ - (N - $R_1$ - N - $R_2$ - 2 - amino - 2 - deoxy-3 - O - $R_3$ - alpha - D - glucopyrano) - $(1\to 4)$ - (di - O-$R_3$ - alpha - D - glucopyranan), sodium salt, wherein the grouping N-$R_1$-N-$R_2$- is a member of the group consisting of alkylamino, acylamino, and alkylideneimino, and wherein the grouping $R_3$O- is a member of the group consisting of alkyloxy, alkenyloxy, aryloxy, and acyloxy.

20. The process of producing (1→4)-(6-O-trityl-alpha-D-arabino-hexopyranosulo)-(1→4)-(6-O-trityl-alpha-D-glucopyranan) which comprises the step of oxidizing the 2-hydroxyl group of 6-O-tritylamylose with dimethyl sulfoxide.

21. The process of producing (1→4)-(2-amino-2-deoxy-alpha-D-glucopyrano)-(1→4)-alpha-D-glucopyranan) which comprises the step of detritylating (1→4)-(2-amino-2-deoxy-6-O-trityl-alpha-D-glucopyrano)-(1→4)-(6-O-trityl-alpha-D-glucopyranan) or an acid addition salt thereof by cleavage with hydrochloric acid to restore 6-hydroxyl groups.

References Cited
UNITED STATES PATENTS

| | | | |
|---|---|---|---|
| 3,210,250 | 10/1965 | Bucourt | 167—74 |
| 3,232,838 | 2/1966 | Nomine et al. | 167—74 |

DONALD E. CZAJA, Primary Examiner

M. I. MARQUIS, Assistant Examiner

U.S. Cl. X.R.

260—211, 233.3, 233.5; 424—183